(12) United States Patent
Han

(10) Patent No.: US 9,936,545 B2
(45) Date of Patent: Apr. 3, 2018

(54) LED VOLTAGE DRIVER CIRCUIT

(71) Applicant: LG INNOTEK CO., LTD., Seoul (KR)

(72) Inventor: Jae Hyun Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/382,785

(22) Filed: Dec. 19, 2016

(65) Prior Publication Data

US 2017/0188422 A1 Jun. 29, 2017

(30) Foreign Application Priority Data

Dec. 28, 2015 (KR) .................... 10-2015-0187466

(51) Int. Cl.
*H05B 33/08* (2006.01)
*H02M 1/00* (2006.01)
(Continued)

(52) U.S. Cl.
CPC ...... *H05B 33/0815* (2013.01); *H02M 1/4225* (2013.01); *H02M 3/158* (2013.01);
(Continued)

(58) Field of Classification Search
CPC ............ H05B 33/0815; H05B 33/0806; H05B 33/0884; H05B 33/0887; H05B 37/02; H05B 33/0824; H05B 33/0842; H05B 41/2853; H05B 33/0809; H05B 33/0812; H05B 33/0821; H05B 33/083;
(Continued)

(56) References Cited

U.S. PATENT DOCUMENTS 8,502,463 B2 * 8/2013 Mizukawa ........... H05B 33/089
315/119
8,525,446 B2 * 9/2013 Tikkanen ........... H05B 33/0815
315/291

(Continued)

FOREIGN PATENT DOCUMENTS

JP 2010-40400 A 2/2010
JP 2011-100621 A 5/2011
(Continued)

OTHER PUBLICATIONS

JPO Office Action for Japanese Application No. 2016-247571, dated Dec. 12, 2017, which corresponds to the above-referenced U.S. Appl.

*Primary Examiner* — Vibol Tan
(74) *Attorney, Agent, or Firm* — LRK Patent Law Firm

(57) ABSTRACT

A light emitting diode (LED) voltage driver circuit includes an input terminal to which a voltage is applied, a ground terminal, an input capacitor whose one end is connected to the input terminal and the other end, which is different from the one end, is connected to the ground terminal, wherein the input capacitor is charged by a voltage difference between the voltage applied to the input terminal and a voltage of the ground terminal, and a buck converter circuit connected to the input capacitor and the input terminal and configured to output power to an LED, wherein the voltage charged in the input capacitor is supplied as an input voltage of the buck converter circuit.

17 Claims, 12 Drawing Sheets

(51) Int. Cl.
*H02M 3/158* (2006.01)
*H02M 1/42* (2007.01)
*H02M 3/156* (2006.01)

(52) U.S. Cl.
CPC ......... *H05B 33/08* (2013.01); *H05B 33/0812* (2013.01); *H05B 33/0842* (2013.01); *H02M 3/156* (2013.01); *H02M 2001/007* (2013.01); *H02M 2001/0009* (2013.01); *Y02B 70/126* (2013.01)

(58) Field of Classification Search
CPC .. H05B 37/00; H02M 3/1582; H02M 3/1588; H02M 1/4225; H02M 3/156; Y02B 70/126; Y02B 20/343; Y02B 70/12
See application file for complete search history.

(56) References Cited

U.S. PATENT DOCUMENTS

| | | | | |
|---|---|---|---|---|
| 8,957,601 | B2* | 2/2015 | Tikkanen | H05B 33/0803 315/294 |
| 8,975,825 | B2* | 3/2015 | Hu | H05B 33/0854 315/239 |
| 2008/0316781 | A1* | 12/2008 | Liu | H05B 33/0815 363/80 |
| 2009/0091950 | A1* | 4/2009 | Chao | H02M 3/155 363/15 |
| 2011/0280083 | A1* | 11/2011 | Choi | G11C 11/5628 365/185.19 |
| 2013/0015774 | A1* | 1/2013 | Briggs | H05B 33/0815 315/186 |
| 2014/0334195 | A1* | 11/2014 | Nussbaum | H02M 3/3376 363/21.04 |
| 2014/0361623 | A1* | 12/2014 | Siessegger | H05B 33/0803 307/64 |
| 2016/0057825 | A1* | 2/2016 | Hu | H05B 33/0815 315/201 |
| 2016/0174307 | A1* | 6/2016 | Tao | H05B 33/0809 315/85 |

FOREIGN PATENT DOCUMENTS

| | | |
|---|---|---|
| JP | 2012-70556 A | 4/2012 |
| JP | 2012-204027 A | 10/2012 |
| JP | 2015-153637 A | 8/2015 |

* cited by examiner

100

200

LED VOLTAGE DRIVER CIRCUIT

CROSS-REFERENCE TO RELATED APPLICATION

This application claims priority to and the benefit of Korean Patent Application No. 2015-0187466, filed on Dec. 28, 2015, the disclosure of which is incorporated herein by reference in its entirety.

BACKGROUND

1. Field of the Invention

The present invention relates to a light emitting diode (LED) voltage driver circuit, and more particularly, to a driver circuit which provides a voltage to an LED.

2. Description of Related Art

Recently, light emitting diode (LED) lighting has emerged as a promising market in a lighting industry in South Korea. Interest in LED lighting has significantly increased as a way to save power in advanced countries as well as due to last year's large earthquake in Japan and the nuclear power plant accident in Fukushima. LED lighting companies in South Korea are actively achieving related certifications in every foreign country to preempt overseas markets, and there is a growing trend of introducing new LED lighting products which added sensibility and various functions that are difficult to realize with conventional fluorescent lamps to the market as well as LED lighting demands for replacing conventional fluorescent lamps.

When a voltage applied to an LED is equal to or more than a threshold voltage of the LED, a current starts to flow through the LED so that light is emitted therefrom. Low-voltage direct current (DC) power is supplied to drive such an LED using a battery, a power supply, or the like.

A power supply is mainly used as a device for supplying low-voltage DC power, and such a power supply receives commercial alternating current (AC) power, converts the AC power into predetermined DC power, then converts the predetermined DC power into LED driving power, and supplies the LED driving power to an LED.

When an LED is driven by a conventional power supply, commercial AC power is converted into a predetermined DC power to drive the LED.

Some methods such as controlling an output of a transformer to be a constant current output for lighting an LED, using a constant current circuit at an output terminal of the LED, using a boost circuit and a constant current circuit, or the like are frequently used as methods for controlling an LED, however, such a conventional control method has a problem in that power conversion efficiency is lowered and the circuit is complicated.

Therefore, an LED voltage driver circuit technology capable of efficiently supplying power to an LED needs to be provided.

SUMMARY OF THE INVENTION

The present invention is directed to providing a driver circuit which supplies a voltage to a light emitting diode (LED).

The technical objectives of the present invention are not limited to the above disclosure, and other objectives not described herein may become apparent to those of ordinary skill in the art on the basis of the following description.

According to an aspect of the present invention, there is provided an LED voltage driver circuit, including an input terminal to which a voltage is applied, a ground terminal, an input capacitor whose one end is connected to the input terminal and the other end, which is different from the one end, is connected to the ground terminal, wherein the input capacitor is charged by a voltage difference between the voltage applied to the input terminal and a voltage of the ground terminal, and a buck converter circuit connected to the input capacitor and the input terminal and configured to output power to the LED, wherein the voltage charged in the input capacitor is supplied as an input voltage of to the buck converter circuit.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
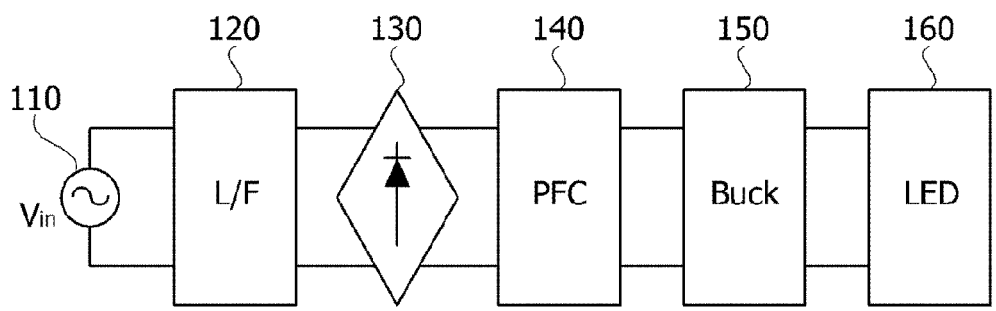
FIG. 1 is a view illustrating a conventional light emitting diode (LED) driver circuit.

Hereinafter, exemplary embodiments of the present invention will be described in detail with reference to the accompanying drawings. Advantages and features of the present invention and methods of accomplishing them will be made apparent with reference to the accompanying drawings and embodiments to be described below. The present invention may, however, be embodied in different forms and is not to be construed as limited to the embodiments set forth herein. Rather, the embodiments are provided so that this disclosure is thorough and complete and fully conveys the inventive concept to those skilled in the art, and the present invention should only be defined by the appended claims. The same reference numerals indicate the same components throughout the specification.

Unless otherwise defined, all terms including technical and scientific terms used herein have the same meaning as commonly understood by one of ordinary skill in the art to which this present invention belongs. It should be further understood that terms such as those defined in commonly used dictionaries are not to be interpreted in an idealized or overly formal sense unless expressly so defined herein.

FIG. 1 is a view illustrating a conventional light emitting diode (LED) driver circuit.

Referring to FIG. 1, a conventional LED driver circuit 100 includes an input power supply 110, a line filter 120, a rectifier 130, a power factor corrector (PFC) 140, a buck converter 150, and an LED 160.

The input power supply 110 may be a power supply which provides an alternating current (AC) voltage and AC current.

The line filter 120 is a filter which filters a variety of noise included in a power line. The line filter 120 may include a low-pass filter configured with a coil and capacitor. The line filter 120 may include a filter which filters electromagnetic interference waves included in the power line.

The rectifier 130 is a circuit which converts AC power into direct current (DC) power. The rectifier 130 may include a bridge circuit.

The PFC 140 boosts an input voltage. For example, a voltage of 100 V to 200 V of the input power supply 110 passes through the PFC 140 so that a voltage of 400 V may be output.

When an output voltage of the PFC 140 is input to the buck converter 150, the buck converter 150 steps down the output voltage to a driving voltage of the LED 160. The buck converter 150 may include a buck circuit. For example, the buck converter 150 may step down an output voltage of 400 V of the PFC 140 to an LED driving voltage of 20 V.

When the buck converter 150 steps down the input voltage of 400 V to the voltage of 20 V, a duty ratio is "20/400=0.05." When the duty ratio is 0.05, the LED driver circuit 100 may have a problem in that driving itself is impossible or efficiency is very low even when the LED driving circuit 100 is driven.

An embodiment of the present invention is related to an invention for an LED voltage driver circuit which replaces the buck converter 150. The LED voltage driver circuit includes a floating ground and has a duty ratio higher than that of the conventional buck converter 150 so that efficiency in LED driving control can be increased.

Figure 2:
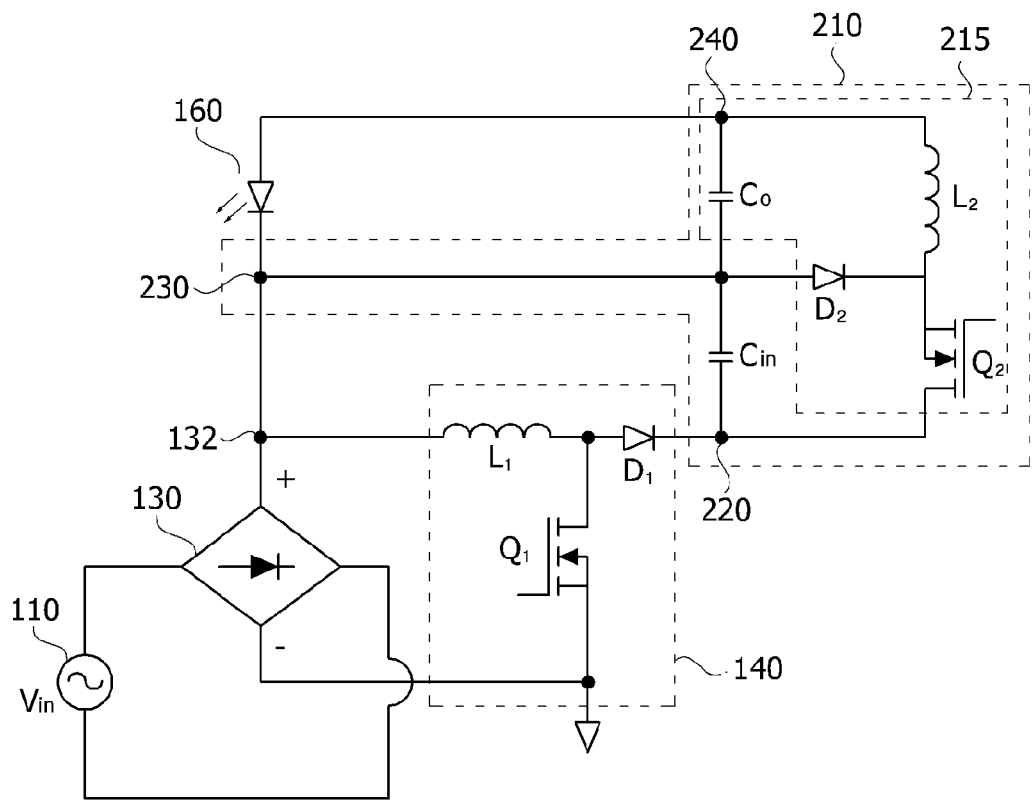
FIG. 2 is a view illustrating an LED driver circuit provided with an LED voltage driver circuit according to one embodiment of the present invention.

FIG. 2 is a view illustrating an LED driver circuit provided with an LED voltage driver circuit according to one embodiment of the present invention.

Referring to FIG. 2, an LED driver circuit 200 may include an input power supply 110 which is an AC power supply, a rectifier 130 having a bridge diode circuit, a PFC 140, an LED voltage driver circuit 210, and an LED 160.

Since the input power supply 110, the rectifier 130, and the LED 160 are the same as those in the configuration of the conventional LED driver circuit 100 of FIG. 1, descriptions thereof will be omitted to avoid duplication.

The LED voltage driver circuit 210 according to one embodiment of the present invention may include an input terminal 220, a ground terminal 230, an input capacitor $C_{in}$, and a buck converter circuit 215.

A voltage output from the PFC 140 may be applied to the input terminal 220. The input terminal 220 may be connected to the input capacitor $C_{in}$ and the buck converter circuit 215.

The ground terminal 230 may include a floating ground. According to one embodiment of the present invention, the ground terminal 230 may be connected to an output terminal of the rectifier 130.

The input capacitor $C_{in}$ may be connected in between the input terminal 220 and the ground terminal 230. One end of the input capacitor $C_{in}$ may be connected to the input terminal 220 and the other end may be connected to the ground terminal 230. The input capacitor $C_{in}$ is charged by a voltage applied to the input terminal 220, and the charged power may be output as an input power of the buck converter circuit 215.

The buck converter circuit 215 may include a buck switch $Q_2$, a buck diode $D_2$, an output capacitor $C_o$, a buck inductor $L_2$, and an output terminal 240.

The buck switch $Q_2$ may control a current flow in the buck converter circuit. The buck switch $Q_2$ may control a flow of a current output from the input capacitor $C_{in}$. The buck switch $Q_2$ may include a bipolar junction transistor (BJT) or a field effect transistor (FET). Although an n-channel metal-oxide semiconductor field-effect-transistor (MOSFET) is used in FIG. 2 for convenience of explanation, this is merely an example, and the present invention is not limited thereto.

The buck diode $D_2$ is connected to the ground terminal 230 and one end of the buck switch $Q_2$. A p-type of the buck diode $D_2$ may be connected to the ground terminal 230 and an n-type thereof may be connected to the buck switch $Q_2$. The buck diode $D_2$ may prevent the power of the input capacitor $C_{in}$ from flowing to the ground terminal 230.

One end of the output capacitor $C_o$ is connected to the ground terminal 230 and the other end thereof is connected to the output terminal 240. The output capacitor $C_o$ may be charged by power input from the input capacitor $C_{in}$, when the buck switch $Q_2$ is turned on and output the charged power to the output terminal 240 when the buck switch $Q_2$ is turned off.

One end of the buck inductor $L_2$ is connected to a junction of the output terminal 240 and the output capacitor $C_o$ and the other end is connected to a junction of the buck switch $Q_2$ and the buck diode $D_2$. The buck inductor $L_2$ may store power provided from the input capacitor $C_{in}$, when the buck switch $Q_2$ is turned on and output the stored power through the output terminal 240 when the buck switch $Q_2$ is turned off.

The PFC 140 may include a PFC inductor $L_1$, a PFC diode $D_1$, and a PFC switch $Q_1$.

One ends of the PFC inductor $L_1$, the PFC diode $D_1$, and the PFC switch $Q_1$ are connected to one junction, and the other end of the PFC inductor $L_1$ is connected to the output terminal of the rectifier 130. The other end of the PFC diode $D_1$ is connected to the input terminal 220 of the LED voltage driver circuit 210. The other end of the PFC switch $Q_1$ may be grounded.

When the PFC switch $Q_1$ receives a turn-on control signal and turns on, a current input from the rectifier 130 passes through the PFC inductor $L_1$ and the PFC switch $Q_1$ and flows to the ground. Here, energy is stored in the PFC inductor $L_1$ due to the current.

When the PFC switch $Q_1$ receives a turn-off control signal and turns off, the energy stored in the PFC inductor $L_1$ is added to the current input from the rectifier 130 and a voltage higher than an output voltage of the rectifier 130 may thus be input to the PFC diode $D_1$. That is, the PFC 140 may be operated as a boost circuit when the PFC switch $Q_1$ is turned off. For example, when the input power supply 110 supplies a voltage of 100 V, a maximum output voltage from the rectifier 130 may be 141.1 V, and the voltage may be boosted by about 260 V so that an output of the PFC 140 is a voltage of 400 V.

FIGS. 3 to 6 are views for describing an operation of an LED voltage driver circuit according to one embodiment of the present invention.

Referring to FIGS. 3 to 6, the operation of the LED voltage driver circuit according to one embodiment of the present invention will be described step-by-step and in detail on the basis of turned-on and turned-off states of the PFC switch $Q_1$ and the buck switch $Q_2$.

Figure 3:
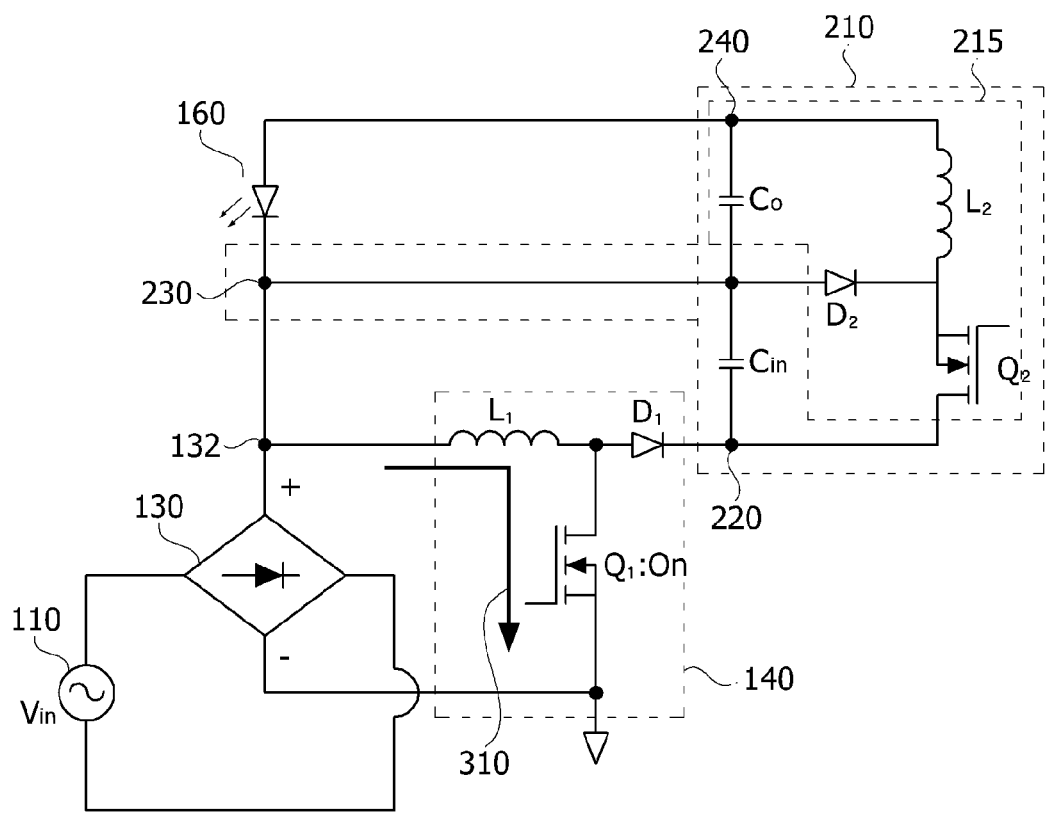
FIGS. 3 to 6 are views for describing an operation of an LED voltage driver circuit according to one embodiment of the present invention.

First, referring to FIG. 3, when the PFC switch $Q_1$ is turned on, an output current 310 of the rectifier 130 flows through the PFC inductor $L_1$ and the PFC switch $Q_1$. Here, energy is stored in the PFC inductor $L_1$ due to the current 310.

Figure 4:
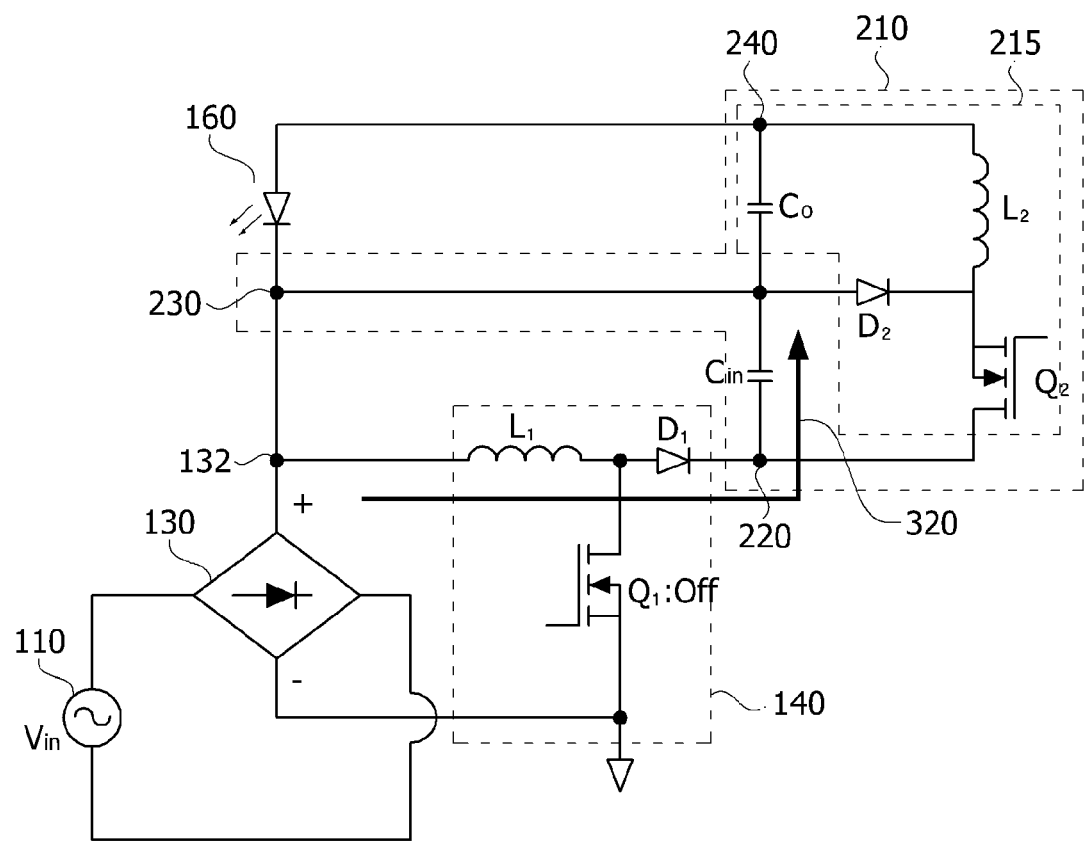

Next, referring to FIG. 4, when the PFC switch $Q_1$ is turned off, an output current 320 of the rectifier 130 flows to the input terminal 220 of the LED voltage driver circuit 210 via the PFC inductor $L_1$ and the PFC diode $D_1$. Here, the energy stored during the operation of FIG. 3 is added to the current that passes through the PFC inductor $L_1$ and thus the current may be boosted to a voltage higher than an output voltage of the rectifier 130. Therefore, the voltage higher than the output voltage of the rectifier 130 is applied to the input terminal 220 of the LED voltage driver circuit 210. Since the buck switch $Q_2$ is in the turned-off state while the PFC switch $Q_1$ is turned off, the applied voltage and the input current charge the input capacitor $C_{in}$. Since one end of the input capacitor $C_{in}$ is connected to the ground terminal 230 and the ground terminal 230 is connected to the output terminal of the rectifier 130, a voltage corresponding to a voltage difference between the output voltage of the PFC 140 and the output voltage of the rectifier 130 may be applied to the input capacitor $C_{in}$.

For example, when the input power supply 110 supplies a voltage of 100 V of AC, a voltage level output from the rectifier 130 may be a maximum of 141.4 V and the voltage output from the PFC 140 may be 400 V. Here, a voltage difference of about 260 V between 400 V and 141.4 V may be applied to both ends of the input capacitor $C_{in}$. That is, the input capacitor $C_{in}$ may be charged with 260 V in a state in which the PFC switch $Q_1$ is turned off and the buck switch $Q_2$ is turned off.

Figure 5:
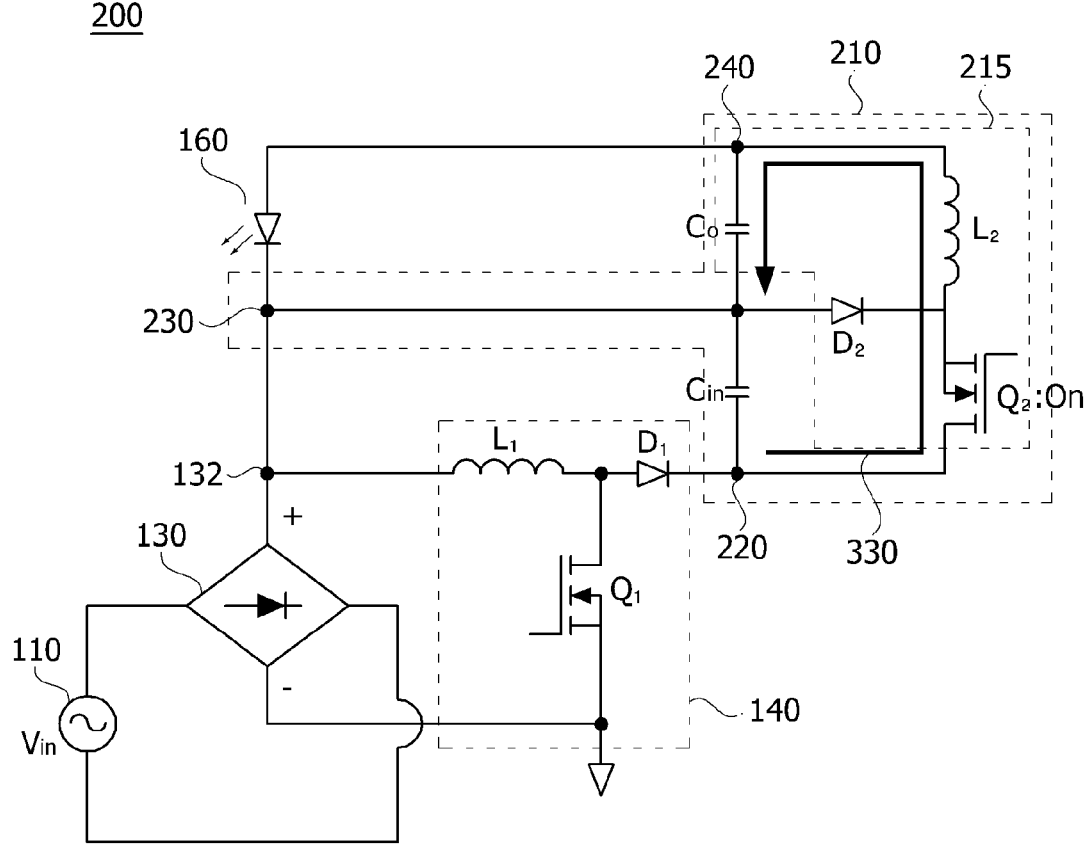

Next, referring to FIG. 5, when the PFC switch $Q_1$ is turned on and the buck switch $Q_2$ is turned on, the output voltage of the PFC 140 is not applied to the input capacitor $C_{in}$ anymore and the power charged in the input capacitor $C_{in}$ may be provided to the buck converter circuit via the buck switch $Q_2$. The input capacitor $C_{in}$ serves as an input power supply of the buck converter circuit, and a current 330 due to the power charged in the input capacitor $C_{in}$ flows through the output capacitor $C_o$ and the buck inductor $L_2$ via the buck switch $Q_2$. Accordingly, the output capacitor $C_o$ may be charged and energy may be stored in the buck inductor $L_2$.

Figure 6:
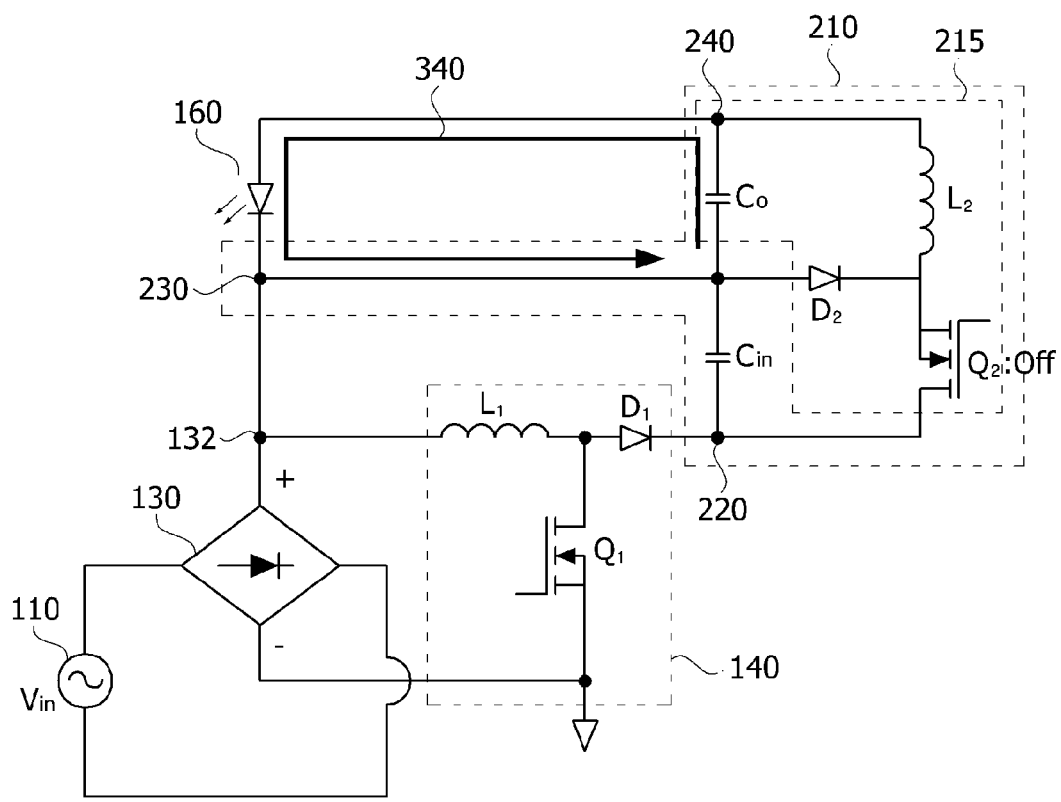

Next, referring to FIG. 6, when the PFC switch $Q_1$ is turned off, the power charged in the input capacitor $C_{in}$ is blocked from flowing to the buck converter circuit side, and a current 340 may flow through the LED 160 due to the power charged in the output capacitor $C_o$ and the energy stored in the buck inductor $L_2$. The LED 160 may emit light due to the current 340.

Referring again to FIGS. 3 to 6, since the ground terminal 230 serves as a floating ground connected to the output terminal of the rectifier 130, a voltage corresponding to a voltage difference between the output voltage of the PFC 140 and the output voltage of the rectifier 130 may be charged in the input capacitor $C_{in}$. That is, a duty ratio may be higher than that of a conventional LED driver circuit because the input capacitor $C_{in}$ is charged to a voltage lower than the output voltage of the PFC 140.

For example, when the input power supply 110 supplies a voltage of 100 V of AC, the maximum output voltage of the rectifier 130 is 141.4 V, the output voltage of the PFC 140 is 400 V, and thereby the input capacitor $C_{in}$ is charged to roughly 260 V. According to one embodiment of the present invention, since the LED driving voltage is 20 V, a duty ratio is "20/260=0.077" which is higher than the conventional duty ratio 0.05. Since the duty ratio is high, the LED driver circuit according to one embodiment of the present invention can have better efficiency and operability.

Figure 7:
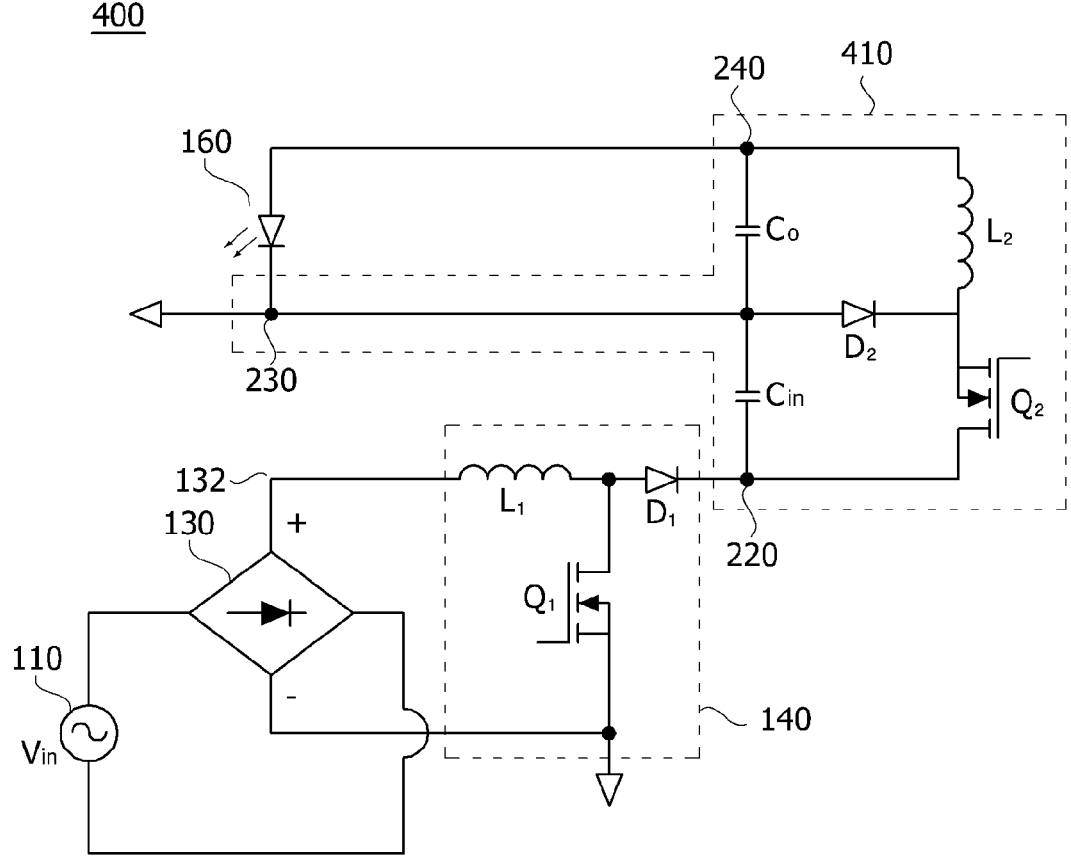
FIG. 7 is a view illustrating an LED driver circuit provided with an LED voltage driver circuit according to another embodiment of the present invention.

FIG. 7 is a view illustrating an LED driver circuit provided with an LED voltage driver circuit according to another embodiment of the present invention.

Referring to FIG. 7, an LED voltage driver circuit 410 according to another embodiment of the present invention may include a ground terminal 230 connected to a ground point different from a ground of an input power supply 110. A difference from the LED voltage driver circuit 210 according to one embodiment of the present invention is the ground terminal 230 not being connected to an output terminal 132 of a rectifier.

FIGS. 8 to 11 are views for describing an operation of the LED voltage driver circuit according to another embodiment of the present invention.

Referring to FIGS. 8 to 11, operations of an LED driver circuit 400 will be described step-by-step in FIGS. 8 to 11.

Figure 8:
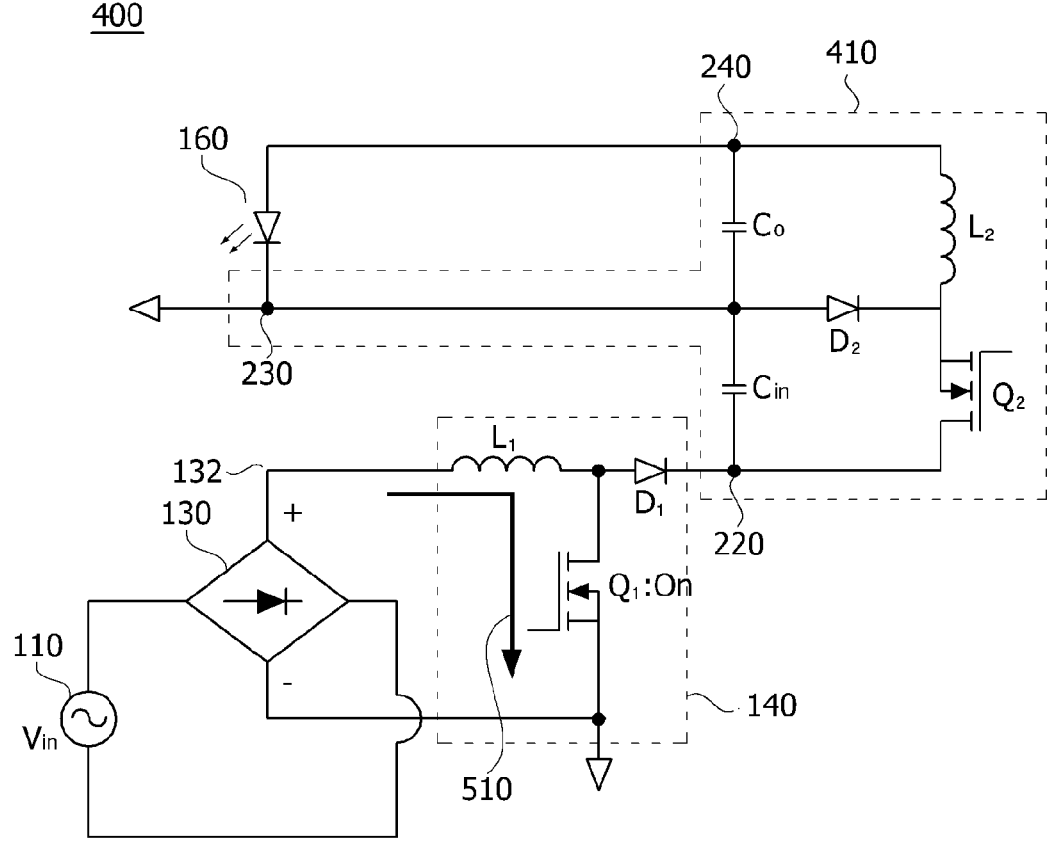
FIGS. 8 to 11 are views for describing an operation of the LED voltage driver circuit according to another embodiment of the present invention.

Referring to FIG. 8, when a PFC switch $Q_1$ is turned on, a current 510 output from a rectifier 130 flows toward the ground via a PFC inductor $L_1$ and the PFC switch $Q_1$. Here, energy is stored in the PFC inductor $L_1$ due to the current 510.

Figure 9:
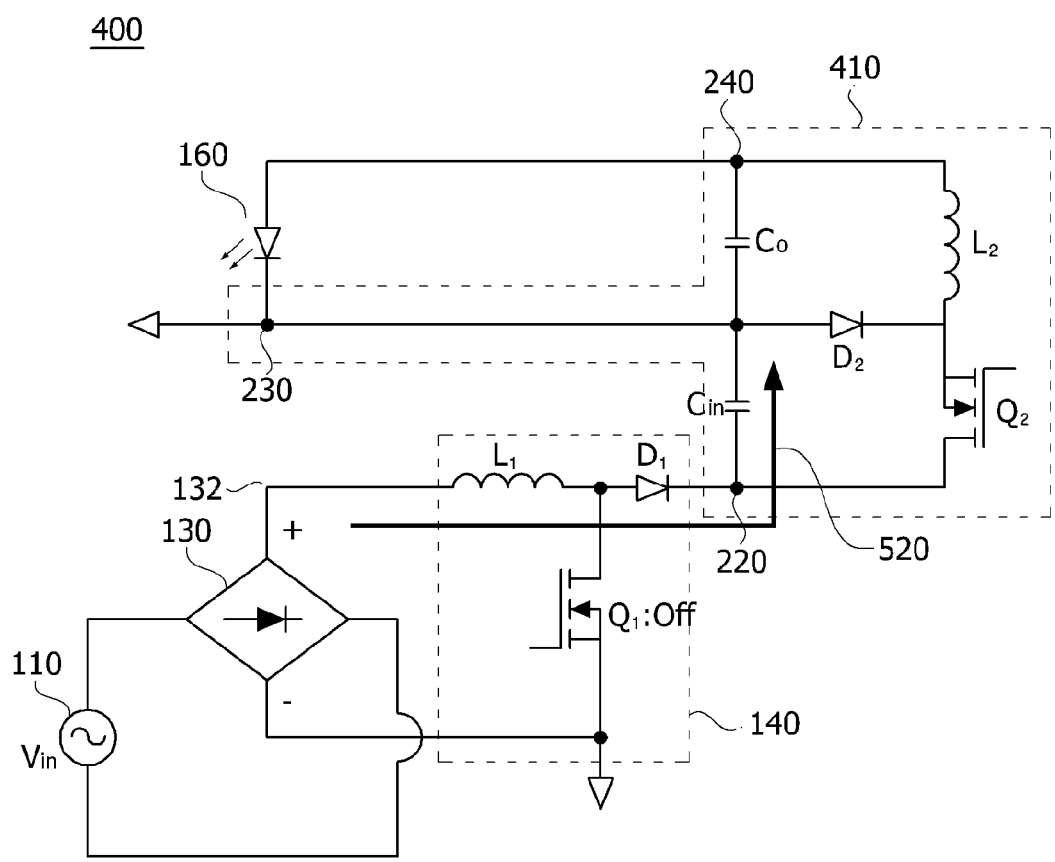

Referring to FIG. 9, when the PFC switch $Q_1$ is turned off and a buck switch $Q_2$ is in the turned-off state, the energy stored in the PFC inductor $L_1$ is added to a current 520 output from the rectifier 130 and the added current is output from a PFC 140, and the current 520 output from the PFC 140 flows in an input capacitor $C_{in}$. The input capacitor $C_{in}$ is charged by the current 520. A voltage corresponding to a voltage difference between the output voltage of the PFC 140 and a voltage of a floating ground connected to a ground terminal 230 may be charged in the input capacitor $C_{in}$.

Figure 10:
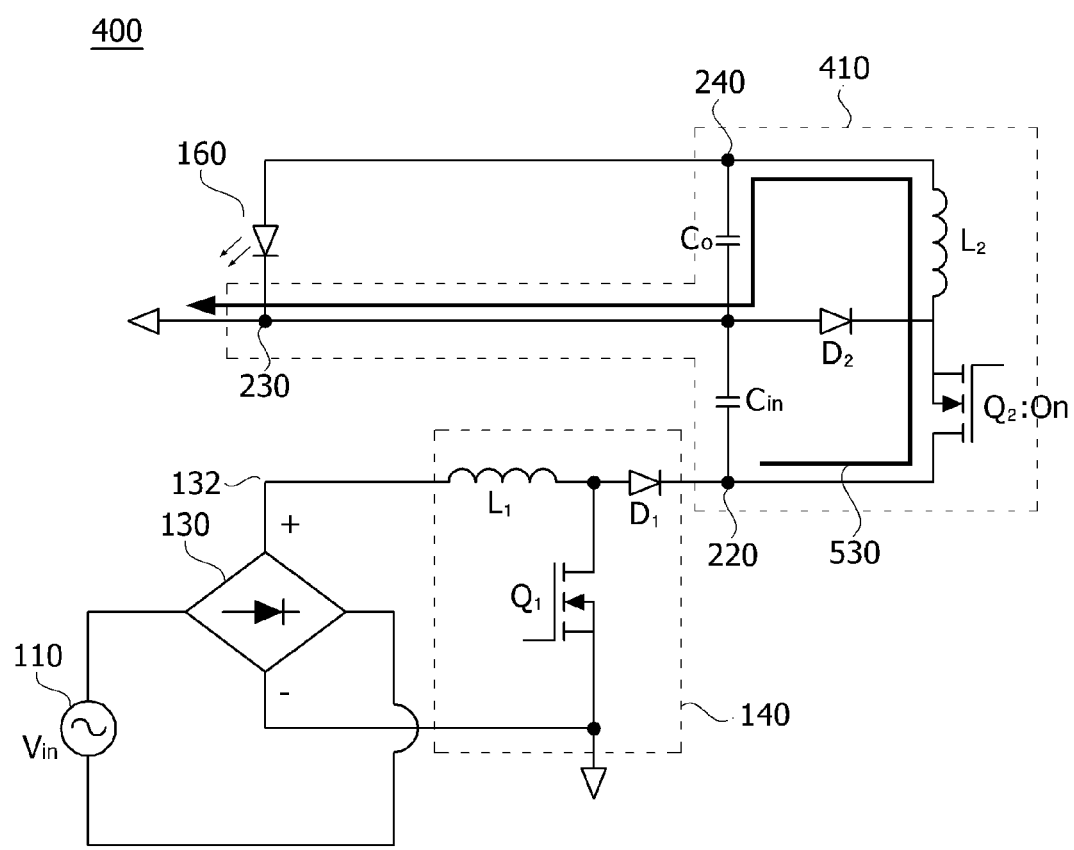

Referring to FIG. 10, when the buck switch $Q_2$ is turned on, the power charged in the input capacitor $C_{in}$ supplies the current 530 to flow through a buck inductor $L_2$ and an output capacitor $C_o$. Energy is stored in the buck inductor $L_2$ and the output capacitor $C_o$ is charged by the current 530.

Figure 11:
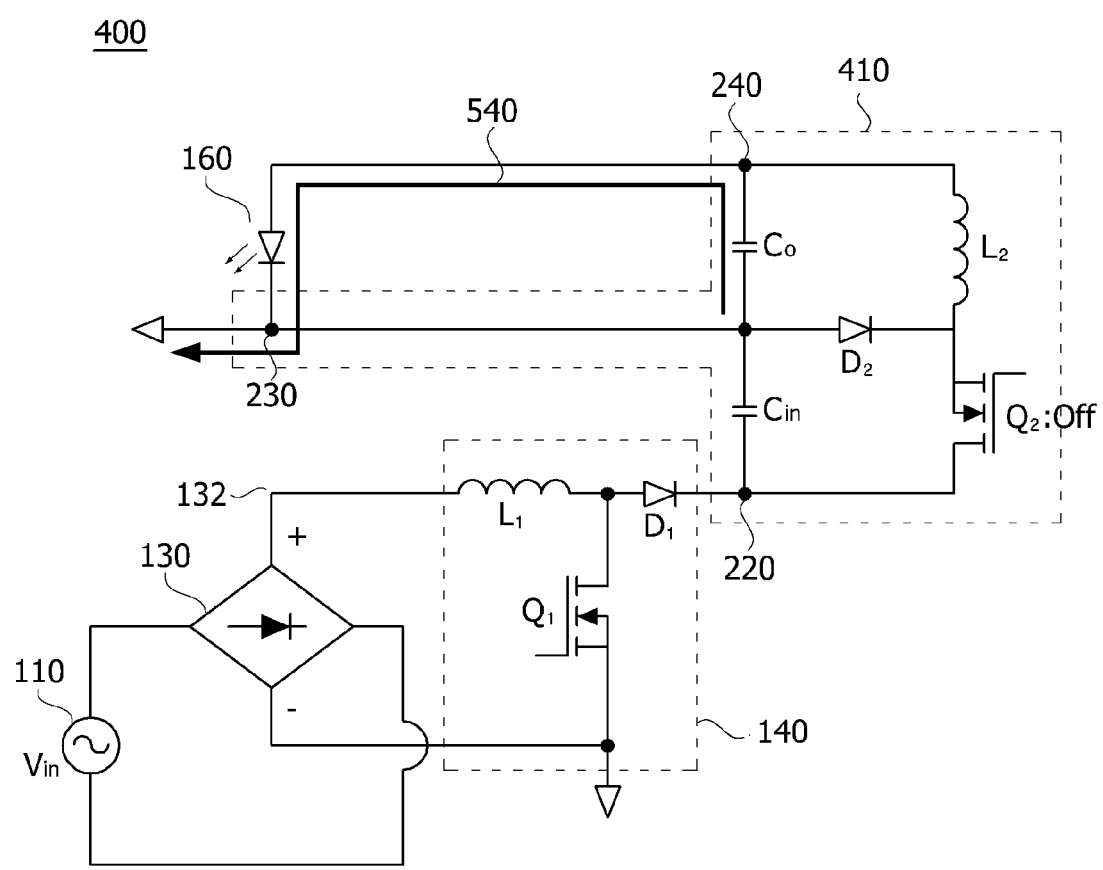

Referring to FIG. 11, when the buck switch $Q_2$ is turned off, a current 540 flows through an LED 160 due to the energy stored in the output capacitor $C_o$ and the buck inductor $L_2$.

Figure 12:
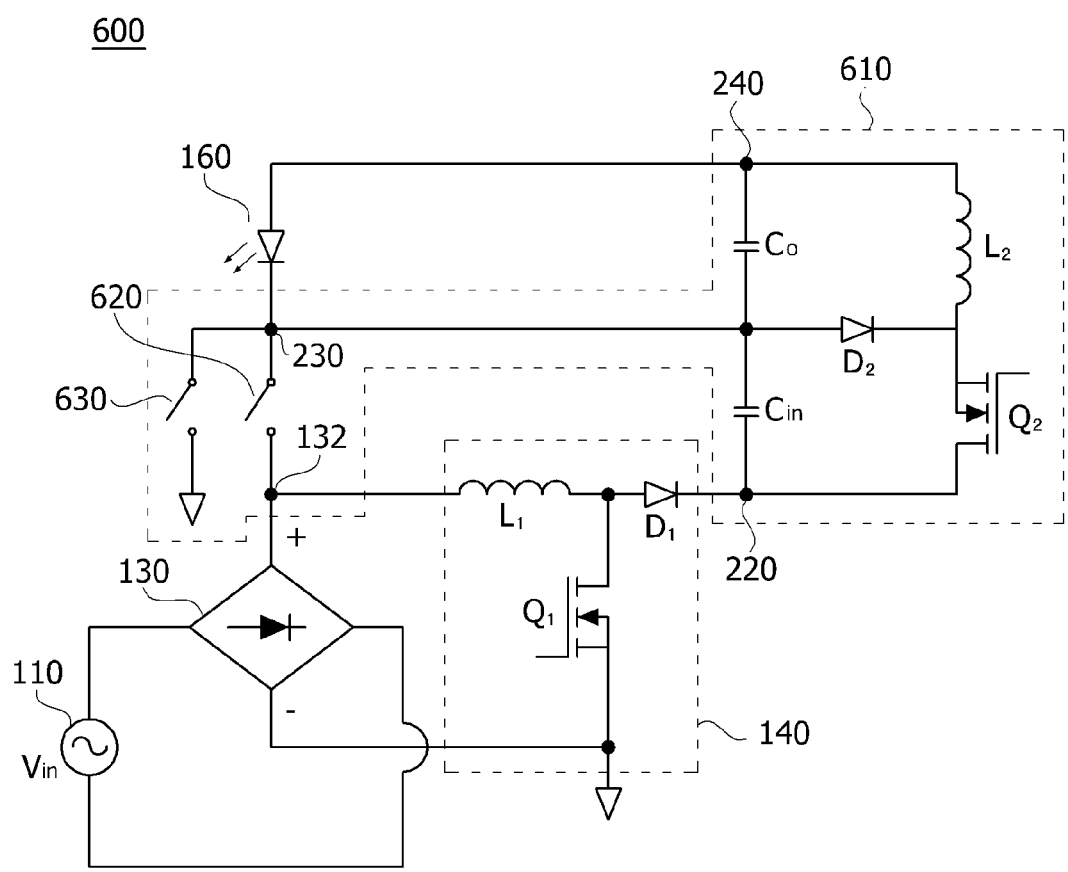
FIG. 12 is a view illustrating an LED driver circuit provided with an LED voltage driver circuit according to still another embodiment of the present invention.

FIG. 12 is a view illustrating an LED driver circuit provided with an LED voltage driver circuit according to still another embodiment of the present invention.

Referring to FIG. 12, an LED driver circuit 600 provided with an LED voltage driver circuit 610 according to still another embodiment of the present invention may include an input capacitor $C_{in}$, a buck diode $D_2$, a buck switch $Q_2$, a buck inductor $L_2$, and an output capacitor $C_o$ which are the same as those in the LED voltage driver circuit 210 and the LED voltage driver circuit 410, and may further include a first switch 620 and a second switch 630.

When the first switch 620 is turned on and the second switch 630 is turned off, the LED voltage driver circuit 610 operates in the same manner as the LED driver circuit 200 provided with the LED voltage driver circuit 210 according to one embodiment of the present invention. When the first switch 620 is turned off and the second switch 630 is turned on, the LED voltage driver circuit 610 operates in the same manner as the LED voltage driver circuit 410 according to another embodiment of the present invention.

The LED driver circuit 600 according to still another embodiment of the present invention turns on either one of the first switch 620 or the second switch 630 according to a load of a LED 160. For example, only the first switch 620 is turned on when the load of the LED 160 is relatively low and only the second switch 630 is turned on when the load of the LED 160 is high.

Figure 13:
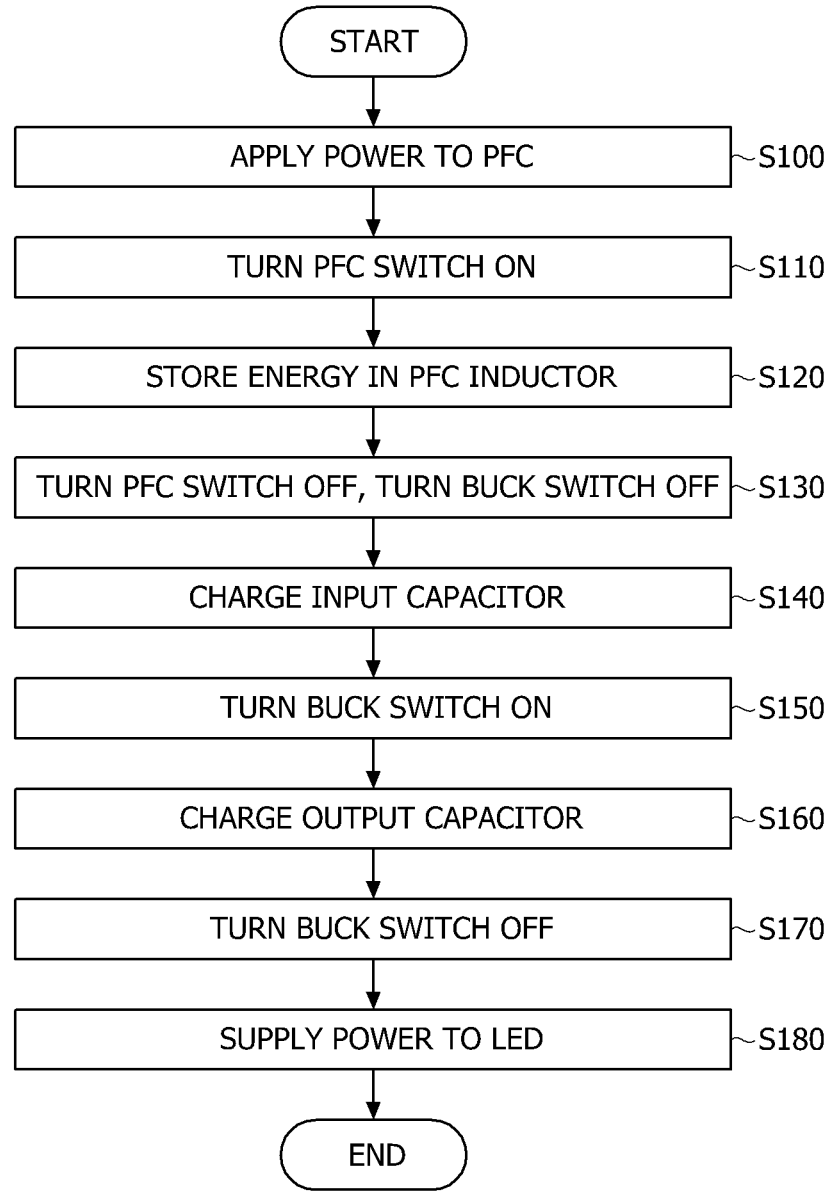
FIG. 13 is a flowchart of a method for driving an LED using the LED voltage driver circuit according to still another embodiment of the present invention.

FIG. 13 is a flowchart of a method for driving an LED using the LED voltage driver circuit according to still another embodiment of the present invention.

Referring to FIG. 13, a method for driving an LED using an LED voltage driver circuit will be described.

Power is applied to a PFC (S100). An output of a rectifier to which AC power is input may be input to the PFC.

A PFC switch included in the PFC is turned on (S110). The LED driver circuit turns on the PFC switch included in the PFC. When the PFC switch is turned on, a current of power applied to the PFC flows in a PFC inductor.

Energy is stored in the PFC inductor included in the PFC (S120). When the PFC switch is turned on, the current flows in the PFC inductor and electromagnetic energy is stored in the PFC inductor due to the current.

The PFC switch is turned off and a buck switch included in the LED voltage driver circuit is turned off (S130). When the PFC switch is turned off, the current of the power applied to the PFC is provided to the LED voltage driver circuit via the PFC inductor and a PFC diode.

An input capacitor included in the LED voltage driver circuit is charged (S140). Since the buck switch is in the turned-off state, the current provided to the LED voltage driver circuit flows toward the input capacitor and the input capacitor is charged by the current.

The buck switch is turned on (S150). When the buck switch is turned on, the energy charged in the input capacitor flows to a buck diode.

An output capacitor included in the LED voltage driver circuit is charged (S160). The current output from the input capacitor flows through the buck inductor and the output capacitor, and the output capacitor is charged by the current.

The buck switch is turned off (S170). When the buck switch is turned off, the energy charged in the buck inductor and the output capacitor is discharged.

Power is provided to an LED (S180). The energy discharged from the buck inductor and the output capacitor flows to the LED as a current.

The LED voltage driver circuit according to the embodiments of the present invention enables a switching control with a high duty ratio and has an effect of enhancing stability and efficiency of the driver circuit.

Embodiments of the present invention have been described above with reference to the accompanying drawings. Those skilled in the art should understand that the present invention may be implemented in other forms different from the disclosed embodiments without modifying the technical spirit or essential features of the disclosure. Therefore, the above described embodiments should be considered in a descriptive sense only and not for the purpose of limitation.

What is claimed is:

1. A light emitting diode (LED) voltage driver circuit comprising:
   an input terminal to which a voltage is applied;
   a ground terminal;
   an input capacitor whose one end is connected to the input terminal and the other end, which is different from the one end, is connected to the ground terminal, wherein the input capacitor is charged by a voltage difference between the voltage applied to the input terminal and a voltage of the ground terminal; and
   a buck converter circuit connected to the input capacitor and the input terminal, and configured to output power to an LED,
   wherein the voltage charged in the input capacitor is supplied as an input voltage of the buck converter circuit, and
   wherein the buck converter circuit includes:
   an output terminal through which a voltage that is applied to the input terminal and stepped down to an LED driving voltage is output to the LED;
   a buck switch whose one end is connected to the input terminal;
   a buck diode whose one end is connected to the ground terminal and the other end is connected to the other end of the buck switch;
   an output capacitor whose one end is connected to the ground terminal and the other end is connected to the output terminal; and
   a buck inductor whose one end is connected to a junction of the output terminal and the output capacitor and the other end is connected to a junction of the buck switch and the buck diode.

2. The LED voltage driver circuit of claim 1, wherein the ground terminal provides a floating ground as a ground.

3. The LED voltage driver circuit of claim 1, wherein:
   the input terminal receives a voltage output from a power factor corrector (PFC); and
   the ground terminal is connected to a power input terminal of the PFC to provide a voltage of the power input terminal as a ground.

4. The LED voltage driver circuit of claim 1, wherein:
   the ground terminal includes a first switch connected to a floating ground and a second switch connected to a power input terminal of a power factor corrector (PFC) which provides a voltage to the input terminal;
   the first switch is turned on when the second switch is turned off, wherein the ground terminal provides the floating ground as a ground; and
   the second switch is turned on when the first switch is turned off, wherein the ground terminal provides a voltage of the power input terminal of the PFC as the ground.

5. The LED voltage driver circuit of claim 1, wherein the input capacitor is charged with the voltage applied to the input terminal when the buck switch is turned off and transfers the charged power to the output capacitor and the buck inductor of the buck converter circuit when the buck switch is turned on.

6. The LED voltage driver circuit of claim 1, wherein the output capacitor is charged with power received from the input capacitor when the buck switch is turned on and outputs the charged power to the output terminal when the buck switch is turned off.

7. The LED voltage driver circuit of claim 1, wherein the buck inductor stores power received from the input capacitor when the buck switch is turned on and outputs the stored power to the output terminal when the buck switch is turned off.

8. The LED voltage driver circuit of claim 1, wherein the output terminal outputs power stored in the output capacitor and the buck inductor when the buck switch is turned off.

9. A light emitting diode (LED) driver circuit for supplying power to an LED, comprising:
   an input power supply to which alternating current (AC) power is applied;
   a rectifier which converts the applied AC power into direct current (DC) power;

a power factor corrector (PFC) which boosts the converted DC power; and an LED voltage driver circuit which steps down the power boosted in the PFC to an LED driving voltage to provide the LED driving voltage to the LED, wherein the LED voltage driver circuit includes:

an input terminal to which the power boosted in the PFC is applied;

a ground terminal;

an input capacitor whose one end is connected to the input terminal and the other end is connected to the ground terminal, wherein the input capacitor is charged by a voltage difference between a voltage applied to the input terminal and a voltage of the ground terminal; and a buck converter circuit connected to the input capacitor and the input terminal, and wherein the buck converter circuit includes:

an output terminal through which a voltage applied to the input terminal and stepped down to the LED driving voltage is output to the LED;

a buck switch whose one end is connected to the input terminal;

a buck diode whose one end is connected to the ground terminal and the other end is connected to the other end of the buck switch;

an output capacitor whose one end is connected to the ground terminal and the other end is connected to the output terminal; and a buck inductor whose one end is connected to a junction of the output terminal and the output capacitor and the other end is connected to a junction of the buck switch and the buck diode.

10. The LED driver circuit of claim 9, wherein the voltage charged in the input capacitor is supplied as an input voltage of the buck converter circuit.

11. The LED driver circuit of claim 9, wherein the ground terminal provides a floating ground or a voltage of a power input terminal of the PFC as a ground.

12. The LED driver circuit of claim 9, wherein the input capacitor is charged with the voltage applied to the input terminal when the buck switch is turned off and transfers the charged power to the output capacitor and the buck inductor of the buck converter circuit when the buck switch is turned on.

13. The LED driver circuit of claim 9, wherein the output capacitor is charged with power received from the input capacitor when the buck switch is turned on and outputs the charged power to the output terminal when the buck switch is turned off.

14. The LED driver circuit of claim 9, wherein power received from the input capacitor is stored in the buck inductor when the buck switch is turned on and the power stored in the buck inductor is output to the output terminal when the buck switch is turned off.

15. The LED driver circuit of claim 9, wherein the output terminal outputs power stored in the output capacitor and the buck inductor when the buck switch is turned off.

16. A method of driving a light emitting diode (LED) by supplying power to an LED using an LED voltage driver circuit, the method comprising:

applying power to a power factor corrector (PFC);

turning on a PFC switch included in the PFC;

charging energy to a PFC inductor included in the PFC;

turning off the PFC switch and turning off a buck switch included in the LED voltage driver circuit;

charging an input capacitor included in the LED voltage driver circuit, wherein one end of the input capacitor is connected to an input terminal included in the LED voltage driver circuit, and the other end of the input capacitor is connected to a ground terminal included in the LED voltage driver circuit;

turning on the buck switch, wherein one end of the buck switch is connected to the input terminal;

supplying energy charged in the input capacitor to a buck diode included in the LED voltage driver circuit, wherein one end of the buck diode is connected to the ground terminal, and the other end of the buck diode is connected to the other end of the buck switch;

charging a buck inductor and an output capacitor included in the LED voltage driver circuit, wherein one end of the output capacitor is connected to the ground terminal, and the other end of the output capacitor is connected to an output terminal included in the LED voltage driver circuit, and wherein one end of the buck inductor is connected to a junction of the output terminal and the output capacitor, and the other end of the buck inductor is connected to a junction of the buck switch and the buck diode;

turning off the buck switch; and supplying power to the LED, wherein the output terminal of the LED voltage driver circuit outputs to the LED a voltage applied to the input terminal and stepped down to an LED driving voltage.

17. The method of claim 16, wherein the supplying of the power to the LED includes supplying the voltage charged in the buck inductor and the output capacitor to the LED.

\* \* \* \* \*